Patented Aug. 24, 1937

2,090,733

UNITED STATES PATENT OFFICE 2,090,733

PRESSURE LUBRICATING APPARATUS

Emile Piquerez, St. Cloud, France

Application November 21, 1935, Serial No. 50,945
In France November 22, 1934

6 Claims. (Cl. 221—47.3)

The object of the present invention is to provide improvements in pressure-lubrication apparatus of the type in which the lubricant is forced into a high pressure cylinder by the pressure of a fluid, generally compressed air.

Lubricating apparatus is already known comprising in combination with a high pressure lubricant booster, an easily detachable lubricant container and provided with devices such that, automatically, the lubricant contained in the container is submitted to the pressure of a fluid when the apparatus is in use.

The improvement forming the object of the present invention, has as its purpose to apply to such apparatus lubricant containers or packings having an extensible or inextensible flexible wall.

With this object, the improved lubricating apparatus according to the present invention comprises a leak-proof casing, having an opening in communication with the inlet opening of the lubricant in the high pressure device, the said casing being of such dimensions that it can enclose the full lubricant container, means permitting the said casing to be opened in order to introduce the container, means for bearing on and maintaining the discharge orifice of the container against the orifice in the casing, means for ensuring the tightness of this connection and means for conducting a fluid under pressure into the casing between its internal wall and the external wall of the container, so as to crush the latter and to force the lubricant towards the booster apparatus.

In one preferred constructional form, a part of the wall of the casing is solid with the body of the booster apparatus, the lubricant discharge orifice of the casing being formed in said part of the wall. The body of the casing is fixed in a removable manner on the said part, a leak-proof joint being provided between these two members. A small tube connected to a passage conducting the motive fluid to the booster apparatus, permits the admission of air into the casing around the lubricant container.

A non-return valve, arranged in the path of the fluid under pressure, maintains the pressure in the casing even when the booster apparatus is inoperative.

A pressure-release member permits the evacuation of the pressure within the casing, so that the latter may be opened.

The leak-proof joint between the fixed part and the movable part of the casing is advantageously obtained by locking between these two parts a rim or bulging part or a portion of the wall of the container, so as to hold the latter in a fixed position.

The locking of the movable part between the fixed part may be carried out by assembling screws, preferably provided with butterfly nuts.

In a constructional modification the movable part is connected to the fixed part by an articulation, the locking means being arranged on the circumference of the joint in the part opposite to the articulation.

In this last mentioned method of construction, it is particularly advantageous to lead the fluid under pressure into the movable part of the casing by utilizing a hinge provided with a turnable joint of any known form.

In another constructional form, the body of the casing is arranged to be fixed in position on the booster apparatus and has at a suitable position on its wall a leak-proof closure plug, whereby the filled container can be introduced into it.

Resilient means, bearing on the movable plug, permit the part of the wall of the container having the discharge hole to bear against the part of the wall of the casing in which is the mouth of the passage leading to the booster member.

Other characteristics of the invention will appear in the following description of constructional forms of the apparatus which are shown, by way of example, on the accompanying drawings, whereon:—

Referring to the drawings:—

Figure 1:
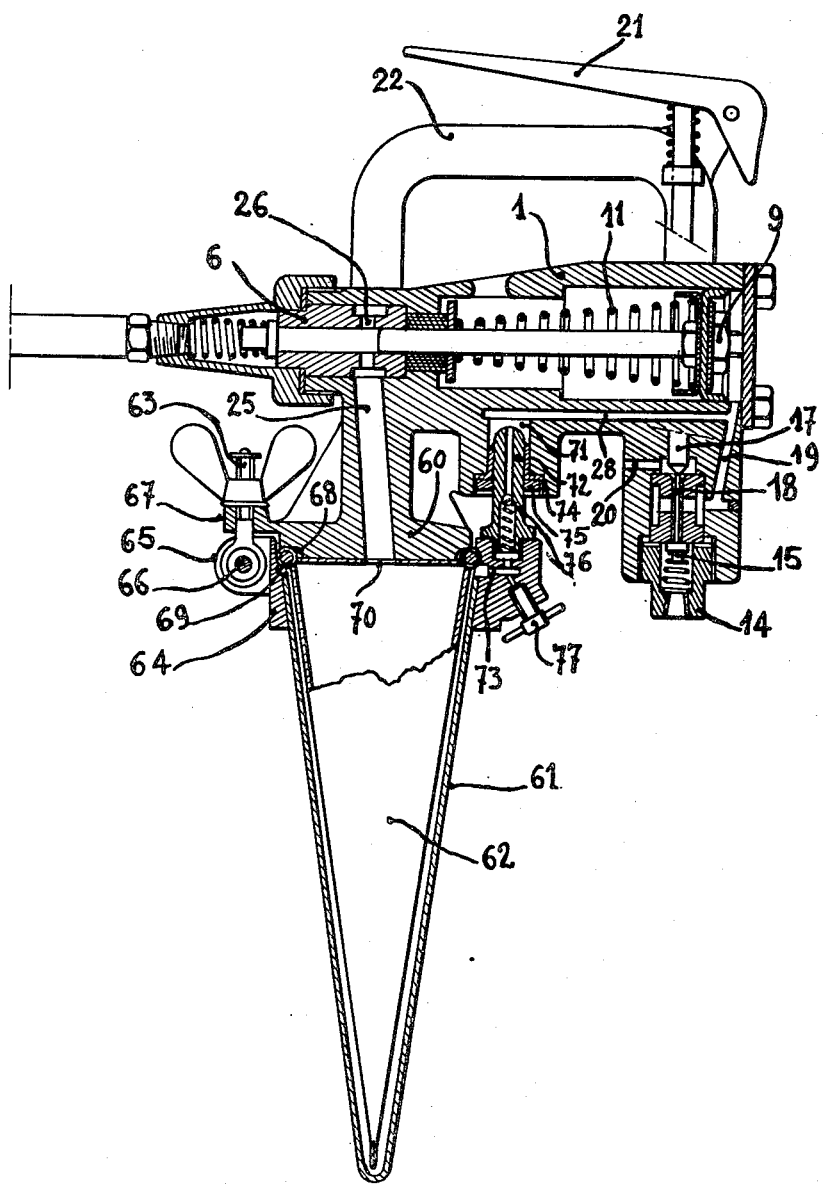
Fig. 1 is an axial section of one form of apparatus.

The body portion 1, enclosing all the booster mechanism, has opposite to its grasping handle 22, a base 60 in the centre of which opens out a passage 25 communicating with ports 26 for the admission of lubricant into the high pressure cylinder 6. The receptacle or casing 61 arranged to enclose the container 62, is fixed on the base 60 by means of three screws 63, provided with butterfly nuts, only of the screws being shown in the drawings. In order to ensure the fixing of the receptacle 61, the body thereof is reinforced in the neighbourhood of its upper edge by a small collar 64 having bosses 65 between which are housed the heads of the screws 63. The latter can pivot around pins 66, in order to be disengaged from lugs 67 integral with the base 60.

In the base 60 is formed a circular groove 68 opposite to a similar groove 69 formed in the small collar 64, a rim surrounding the end of the container 62 being engaged within said groove and the tightness of the joint being obtained by the locking of the said rim between the base 60 and the small collar 64.

At the same time, the container is held in place with its bottom part bearing on the face of the base 60 and with its discharge opening 70 opposite to the end of the passage 25.

Compressed air, operating the booster device, flows through a union 14, a valve 15 and a passage 19 with which communicates a channel 28 arranged to conduct the air into a chamber 71. In the latter is engaged a union 72 fixed on the small collar 64 and formed with a passage which communicates with a passage 73 formed in the collar and opening out into the interior of the casing 61. A leather joint 74, held in the chamber 71 by a nut 75 ensures air-tightness around the union 72. A non-return valve 76 is arranged in the union 72, a pressure-release needle valve 86 allowing the passage 73 and, consequently, the interior of the casing 61 to be put into communication with the atmosphere.

The operation of the apparatus is as follows:—

The container 62, which is filled with lubricant and the opening 70 in which has been previously opened, is introduced into the casing 61, whereafter the latter is arranged in position under the base 60 with the union 72 engaged in the chamber 71. The nuts on the screws 63 are then screwed on to the lugs 67, in such a manner as to force the casing solidly into position and thus to ensure the tightness of the joint.

By pressing on the handle 21, the needle valve 17 is forced on to its seat, whilst the extension 18 bears on the valve 15 and forces it away from its seat. Compressed air then flows into the passages 19 and 28, through the first mentioned of which it reaches the air cylinder, forcing the piston 99 to the left and compressing the spring 11.

At the same time, the compressed air admitted through the passage 28, the union 72 and the passage 73 flows into the casing 61 around the wall of the container 62. The walls of the latter tend to be crushed and the lubricant is expelled through the opening 70 and the passage 25 towards the ports 26 in the booster cylinder.

When the handle 21 is released, the valve 15 is closed and interrupts the inlet of compressed air, whilst the needle valve 17, moving away from its seat, puts the passage 19 into communication with the atmosphere through the passage 20. The air which is in the cylinder escapes through that path and the piston 9 is moved backwards by the extension of the spring 11.

During the period that the air is escaping, however, the air admitted into the casing 61 is retained by the valve 76 and tends to fill the booster cylinder completely from the time the piston has uncovered the ports 26.

A further pressure on the handle 21 causes a stroke of the piston 9 and the expulsion of lubricant into the pipe line. At the same time, a certain quantity of air is admitted into the casing 61 to maintain the pressure therein.

Figure 2:
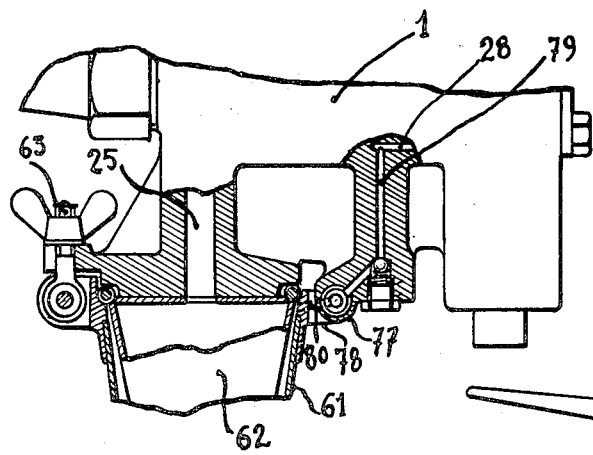
Fig. 2 shows a modification of a constructional detail of the apparatus.

In the modified construction, shown in Fig. 2, the casing 61 is fixed to the body of the apparatus by an articulation and a locking screw 63 arranged on opposite ends of a diameter. The articulation comprises a tenon 77 integral with the body of the apparatus and housed between two cheeks 78 integral with the small collar 64, a hollow rod providing the axis of articulation.

The air inlet passage 28 is extended by a passage 79 which opens out into the said hollow rod, the latter communicating, on the other hand, with a passage 80 formed in one of the cheeks 78 and opening out into the casing 61.

Figure 3:
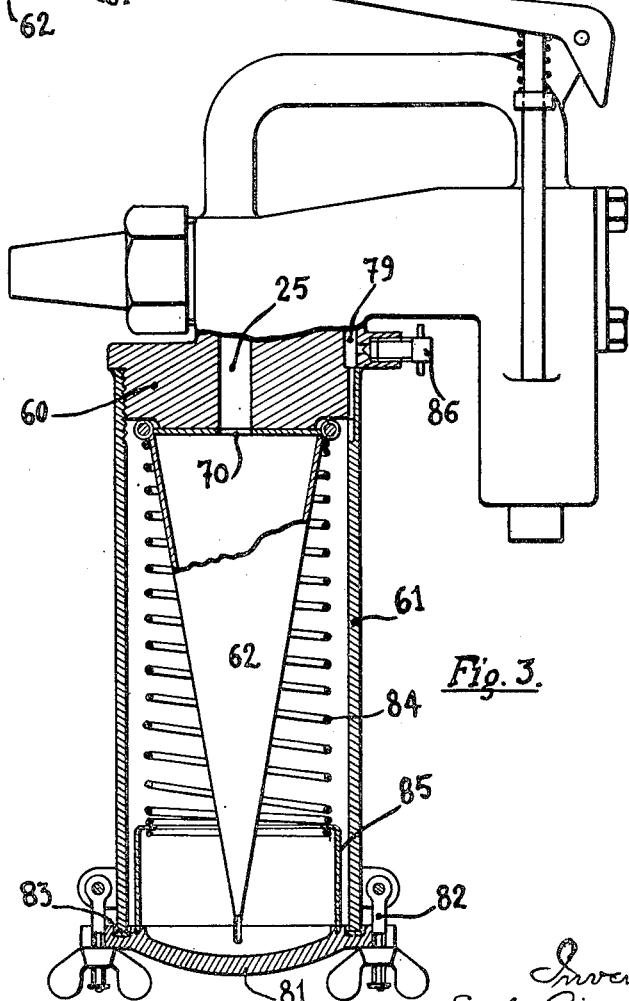
Fig. 3 shows, partly in section, another modified construction of the apparatus.

In the modification shown in Fig. 3, the casing 61 consists of a tube fixed in position on the base 60 of the body of the apparatus. The said tube, which is open at its lower end, can be closed by a cover 81 held by locking screws 82, a joint 83 ensuring the tightness of the closure.

The container 62 must be held in place in such a manner that its base is in contact with the under surface of the base 60 and so that its opening 70 registers with the mouth of the channel 25. With this object in view, a spring 84 of a diameter greater than that of the container is arranged around the latter and bears at one end on a small collar 85 fixed to the cover 81 and, at its other end, on the rim or bulging part surrounding the bottom of the container.

Compressed air is led through the passage 79 directly into the interior of the casing 61 and a pressure-release valve 86 allows the pressure of the container to be evacuated.

The pressure exerted by the compressed air on the wall of the container 62 is transmitted by the lubricant over the whole of the surface of the bottom, in such a manner that the latter is forcibly pressed against the base 60. Tightness is thus ensured at the circumference of the opening 70, without the necessity of giving the spring 84 a considerable tension.

The above description is given only by way of example and to make the invention clearer and it will be evident that other constructions can be provided. For example, the bottom of the container 62 could have a small externally-threaded tube which could be screwed into the mouth of the channel 25 also suitably screw-threaded. Tightness could easily be obtained by this connection and a tight-joint would only have to be provided between the casing 61 and the body 60.

The container could also be fixed on the body 60 by a bayonet connection obtained by hooking the rim or bulging part which surrounds the bottom of the said container on hooks integral with the base. Such a system of hooking is known in itself and the invention only visualizes its application in the combination described.

The booster apparatus could also be of any other system and operated mechanically. For example, the casing 61 could be combined with a booster operated by an electric motor, the said motor driving at the same time a small pump which would force compressed air into the interior of the casing 61.

The grease container instead of being mounted directly on the booster apparatus could be arranged at a certain distance from the latter. In other words, the passage 25 could be of any length whatever and consist of a flexible or rigid conduit or tube.

I claim:—

1. In a pressure lubricating apparatus including a body, a charging cylinder and its piston, a lubricant reservoir with a rigid bottom, provided with a discharge opening and a lateral wall of flexible material, a supporting base on the body for the bottom of the reservoir, an opening in the base arranged to communicate with that in the reservoir, said opening being connected to the charging cylinder, a casing screwed onto the body concentrically to the supporting base, a movable cover for the casing, a spring arranged between the cover and the reservoir for causing the bottom of the latter to be applied on the said supporting base and an inlet conduit for compressed air in the body, said conduit opening out in the said casing.

2. In a fluid pressure actuated lubricating apparatus, a body portion having a lubricant discharge cylinder, and a lubricant feed passage opening to said cylinder, a lubricant forcing piston in said cylinder, a pressure chamber, a compressed air inlet opening in said chamber, a lubricant container in said chamber having a deformable wall, said container being provided with a discharge opening, the pressure chamber being provided with an opening for introduction of the lubricant container, means for closing the opening through which the container is introduced into the casing and for tightly connecting the discharge opening of the lubricant container with the lubricant feed passage of the body portion.

3. In a fluid pressure actuated lubricating apparatus, a body portion having a lubricant discharge cylinder, a lubricant forcing piston in said cylinder, said body portion also having a mounting provided with a centrally located lubricant feed passage opening to the discharge cylinder, a lubricant container having a flat rigid end provided with a centrally located discharge opening, said container also having a deformable lateral wall, a removable casing for holding said container, said casing having an opening for insertion of the lubricant container, said casing holding the container with the rigid end of the container occupying said opening of the casing, means for fixing the casing on the body portion of the lubricating apparatus and simultaneously hermetically applying the rigid end of the container against the mounting of said body portion, and means for passing compressed air into the casing to squeeze the container to expel its contents through the said passage of the body portion into the discharge cylinder.

4. A fluid pressure actuated lubricating apparatus according to claim 3 and in which the rigid end of the container is provided with a peripheral flange, which, when assembled, is squeezed between the casing and the mounting of the body portion.

5. A fluid pressure actuated lubricating apparatus according to claim 3 and in which the casing is connected to the body portion by an articulation having a passage for supplying compressed air to the casing.

6. In a pressure actuated lubricating apparatus, a body portion having a discharge cylinder, a piston in said cylinder, said body portion having a mounting, and having a lubricant feed passage terminating at the center of the mounting, and a lubricant reservoir formed with a rigid end centering on said mounting and having a central discharge opening and having a lateral collapsible wall, a casing having one end fixed to the body portion and encompassing, said casing having a compressed air inlet, the other end of the casing having an opening for introduction of the container, a cover for closing said opening and a spring carried by said cover for applying the rigid end of the container against the mounting of the body portion.

EMILE PIQUEREZ.